United States Patent [19]

Takemoto et al.

[11] Patent Number: 4,757,458

[45] Date of Patent: Jul. 12, 1988

[54] ZERO POINT ADJUSTING ROBOT CONTROL METHOD

[75] Inventors: Akinobu Takemoto, Oyama; Kenzo Takeichi, Tochigi, both of Japan

[73] Assignee: Hitachi, Ltd., Tokyo, Japan

[21] Appl. No.: 894,061

[22] Filed: Aug. 7, 1986

[30] Foreign Application Priority Data

Aug. 7, 1985 [JP] Japan .................. 60-172315

[51] Int. Cl.$^4$ .............................................. G06F 15/46
[52] U.S. Cl. ........................................ 364/513; 901/2; 901/11; 901/46
[58] Field of Search .................. 364/513, 167–171, 364/191–193; 318/568, 601, 603; 250/231 SE; 901/2–5, 11–13, 46, 47, 50; 414/730

[56] References Cited

U.S. PATENT DOCUMENTS

| | | | |
|---|---|---|---|
| 4,432,063 | 2/1984 | Resnick | 364/513 |
| 4,453,085 | 6/1984 | Pryor | 364/513 X |
| 4,590,577 | 5/1986 | Nio et al. | 364/513 |
| 4,608,651 | 8/1986 | Murakami et al. | 364/513 |
| 4,626,756 | 12/1986 | Inaba et al. | 364/513 X |
| 4,647,827 | 3/1987 | Toyoda et al. | 318/594 X |

*Primary Examiner*—Joseph Ruggiero
*Attorney, Agent, or Firm*—Antonelli, Terry & Wands

[57] ABSTRACT

There is disclosed a control method for returning a robot control operation to an accurate zero point before the start of the operation. The method is suitable when applied even to a turning operation of 360 degrees or more. For this control, the arm of the robot is turned counterclockwise at a low speed until a zero position detecting switch is turned on, and these turns are then reversed and stopped when a zero position detecting pulse is generated. The counted value (A) of the deviation between the instant when the zero position detecting switch in this case is turned on and the instant when the zero position detecting pulse is generated is registered. The counted value (B) measured likewise each time during the subsequent zero point adjustments is compared with the aforementioned counted value (A) of the deviation first registered so that the zero point of the control operation of the robot can be detected.

3 Claims, 5 Drawing Sheets

ZERO POINT ADJUSTING ROBOT CONTROL METHOD

BACKGROUND OF THE INVENTION

The present invention relates to a robot control method and, more particularly, to a robot control method suitable for realizing an accurate zero position.

In a control apparatus requiring high precision such as a robot, a zero point adjustment is usually conducted so as to maintain a control accuracy.

The robot according to the prior art has been structurally defective in that the zero point cannot be accurately adjusted or may be displaced if a shaft capable of rotating more than 360 degrees, e.g., the leading end of the wrist of the robot, is turned one rotation or more. In order to compensate for this defect, as is disclosed in Japanese Patent Laid-Open No. 60 - 52293, the robot was adapted with a structure including a mechanical stopper for preventing turning of more than 360 degrees. As a result of such a structure, the problem of the robot having its operation range narrowed has resulted.

SUMMARY OF THE INVENTION

An object of the present invention is for providing a robot control method which is enabled to detect an accurate zero point while improving the aforementioned defect of the prior art to ensure the operation range of 360 degrees or more.

In order to achieve this object, according to the present invention, in case the arm of a robot is at first moved counterclockwise at a low speed until its dog comes into engagement with a zero position detecting switch and is then moved clockwise at a lower speed (e.g., one fifth of the above-specified low speed) until a zero position detecting pulse is generated before the arm is stopped, whether or not the arm has accurately detected the zero point or whether or not the arm has turned 360 degrees or more is determined by counting and registering the deviation between the instant when the dog comes into engagement with the zero position detecting switch and the instant when the zero position detecting pulse is generated, and by comparing a value counted on each subsequent zero point adjustment with the registered counted value.

DESCRIPTION OF THE PREFERRED EMBODIMENT

Figure 1:
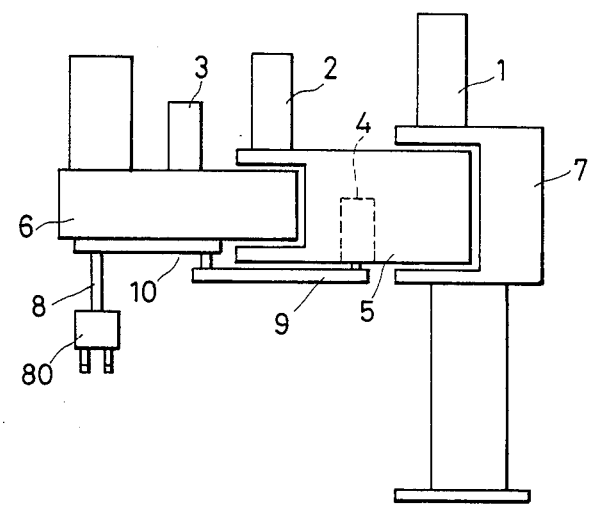
FIG. 1 is a side elevation showing a schematic structure of a robot.

The control method of the present invention will be described in the following with reference to FIGS. 1 to 7. The robot to which the present invention is applied is of the horizontal multi-articulated type having four degrees of freedom so that it is driven, as shown in FIG. 1, by a 1st axis motor 1 participating in the operation of a 1st arm 5, a 2nd axis motor 2 participating in the operation of a second arm 6, a 3rd axis motor 3 participating in vertical motions, and a 4th axis motor 4 participating in turning operations. The 1st arm 5 is supported by a body post 7 whereas the 2nd arm 6 is supported by the 1st arm 5. On the other hand, an operation shaft 8 for turns and vertical motions is driven by both the 3rd axis motor 3 and the 4th axis motor 4 mounted in the 1st arm 5, and especially the wrist turns are speeded down in two stages through a 1st reduction belt 9 and a 2nd reduction belt 10.

Figure 2:
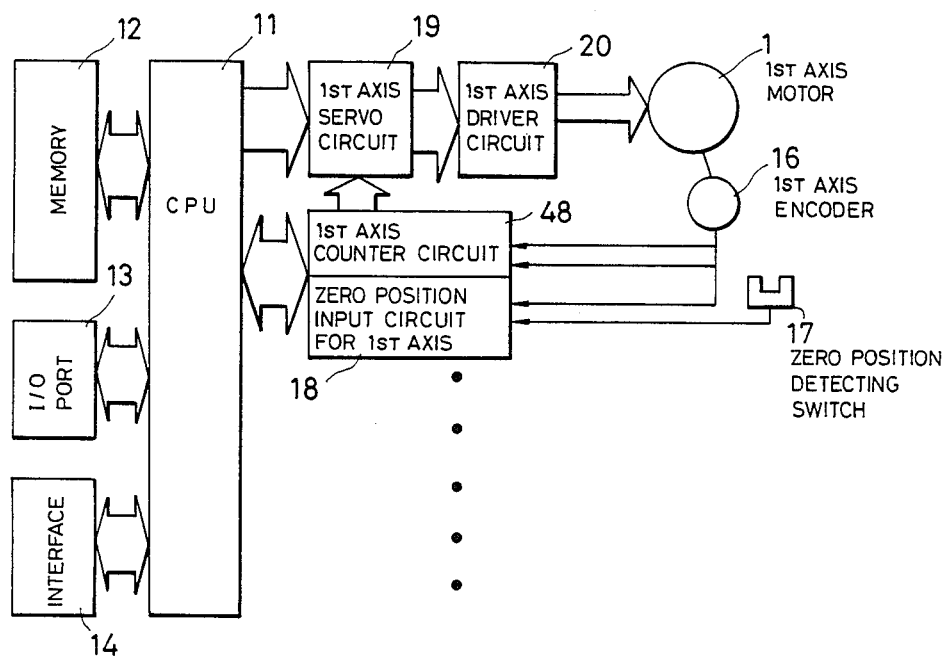
FIG. 2 is a block diagram showing a schematic construction of a robot control system.

More specifically, the operation shaft 8 acts as a wrist twisting shaft for vertically moving and turning a wrist 80 shown in FIG. 1. The aforementioned respective axis motors are DC servomotors which are equipped with rotary pulse encoders for detecting and controlling the position and speed of the robot in terms of a pulse number. FIG. 2 is a block diagram showing the construction of a controller to be used in the present robot. A CPU 11 is operative to communicate with external units and to control the robot. A memory 12 is operative to store the program or position data of the robot. An I/0 port 13 is operative to make inputs to and outputs from the external units. On the other hand, the inputs and outputs, the displays and so on when in operation are conducted by a console interface 14. Moreover, the CPU 11 controls the four 1st to 4th motors. FIG. 2 shows only an example of the 1st axis motor 1 participating in the first arm and omits the others. A 1st, axis counter circuit 48 receives and counts the number of pulses (i.e., A- and B-phase pulses, as will be described with reference to FIG. 4), which are outputted from a 1st axis encoder 16 in accordance with the 1st axis motor. On the other hand, a zero position input circuit 18 for the 1st axis receives both the output of a zero position detecting switch 17 and the pulse (i.e. a later-described Z-phase pulse) output from the aforementioned encoder 16.

The CPU 11 gives a speed instruction to a 1st axis servo circuit 19 on the basis of the data of the counter circuit 48 and the zero position input circuit 18 so that the 1st axis servo circuit 19 outputs a PWM output on the basis of the speed instruction and the data of the counter circuit 48. In response to that PWM output, a 1st axis driver circuit 20 amplifies this output to turn the 1st axis motor 1. By repeating these, the arm of the robot conducts the prescribed operations.

Figure 3:
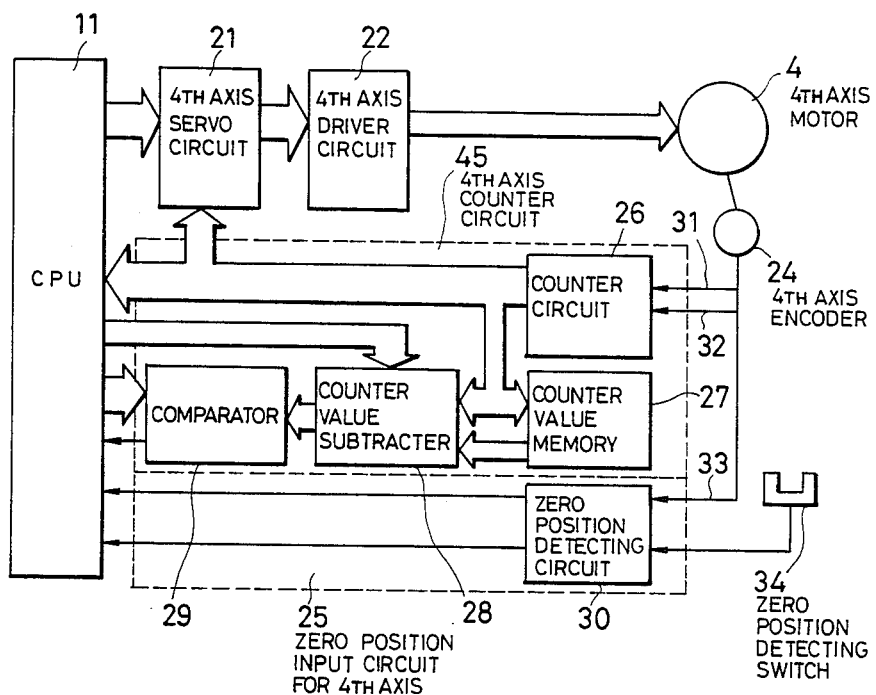
FIG. 3 is a block diagram showing a 4th axis motor control unit.
Figure 4:
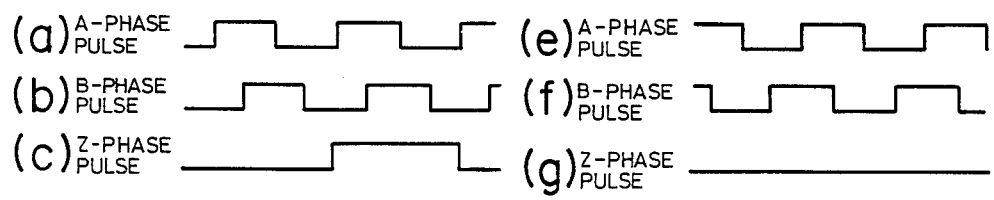
FIG. 4 is a waveform chart for explaining an encoder signal.

Next, the content of the present invention will be described by taking up as an example the control of the turning operations of the operation shaft 8 having the operation range of 360 degrees or more. FIG. 3 shows the construction of the 4th motor control unit of the controller. On the basis of the speed instruction signal given by the CPU 11, a 4th axis servo motor 21 transforms the signal into a PWM, which is fed through a 4th axis driver circuit 22 to turn the 4th axis motor 4. In response to this output, an incremental type 4th axis encoder 24 outputs a pulse according to the r.p.m. of that motor to feed it back to a 4th axis counter circuit 45. This 4th axis counter circuit 45 is composed of a counter circuit 26, a counter value memory 27, a counter value subtracter 28 and a comparator 29. On the other hand, a zero position input circuit 25 for 4th axis is composed of a zero position detecting circuit 30. Moreover, three outputs are fed from the 4th axis encoder 24 to detect the position and the speed. These three outputs are: the A-phase pulse which is transmitted through line 31 of FIG. 3, as shown in FIG. 4(a); the B-phase pulse which is transmitted through line 32 of FIG. 3, as shown in FIG. 4(b); and the Z-phase pulse which is transmitted through line 33 of FIG. 3, as shown in FIG. 4(c). Incidentally, FIGS. 4(a) to 4(c) show the clockwise turns whereas FIGS. 4(e) to 4(g) show the counterclockwise turns. The counter circuit 26 is counted down or up in response to the rising and falling edges of the A- and B-phase pulses and in accordance with the phase difference between the A- and B-phase pulses. The 4th axis encoder 24 of the controller to be used in the present embodiment has such A- and B-phases as will output 2,000 pulses when the 4th axis motor 4 turns one rotation and such a Z-phase as will output one pulse having a width equal to that of four A- and B-phases for one turn of the motor 4.

Figure 5:
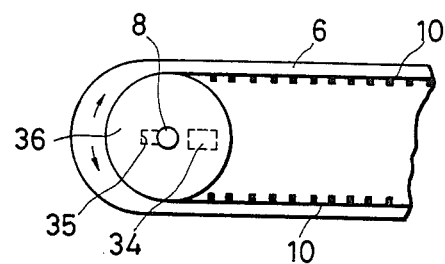
FIG. 5 is a front elevation showing an operation axis participating in a turning operation.
Figure 6:
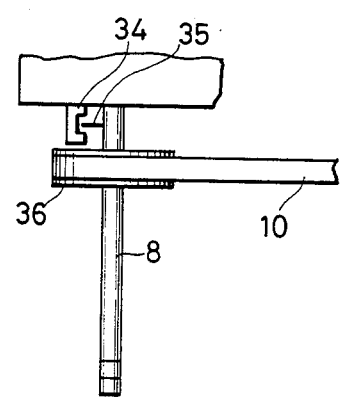
FIG. 6 is a side elevation showing the same operation axis.

The zero point adjustment to be used in the present invention will be described with reference to FIGS. 5 and 6. Incidentally, FIGS. 5 and 6 are a front elevation and a side elevation, respectively, for explaining a mechanism participating in the rotating operation. Reference numeral 36 designates a reduction pulley.

The CPU 11 gives to the 4th axis servo circuit 21 an instruction to effect a counterclockwise rotation at a low speed so as to drive the 4th axis motor 4. Then, the CPU 11 waits for a signal from the zero position detecting circuit 30 indicating that a zero position detecting dog 35 which is carried on the operation shaft 8 for vertically moving and turning the wrist turns on a zero point detecting switch 24. In response to the signal from the zero position detecting circuit 30 indicating that the zero position detecting switch 34 is turned on, the CPU 11 turns the 4th axis motor 4 counterclockwise at a lower speed and stops it when the Z-phase pulse of the 4th axis encoder 24 is outputted from the encoder 24. A series of these operations end the the zero point adjustment. Since the Z-phase pulse is always outputted at a predetermined position when this method is used, the zero point adjustment can be ended at a predetermined position whenever the corresponding axis is not turned 360 degrees or more. If this axis is turned one rotation for the zero point adjustment in case the turn of 360 degrees or more is possible, the Z-phase pulse is outputted from a position different from the ordinary one. A reason for this will be described in the following. The operation shaft 8 participating in the turns of the present robot is speeded down, as shown in FIG. 1, by the first reduction belt 9 and the second reduction belt 10 with respective reduction ratios of 44:10 and 36:14. This results in the total reduction ratio of 11.31:1. If the operation shaft 8 is to be turned one rotation, therefore, it is necessary to turn the 4th axis motor 4 of 11.31 rotations. Since the Z-phase pulse to be transmitted through the line 33 is outputted once for one rotation of the 4th axis motor 4 and with a width of that of four pulses, it is outputted at a position of 0.31 rotations, i.e., with a shift of 2,000×0.31 =620 pulses from the encoder 24 in case the operation shaft 8 is turned one rotation. In other words, the operation shaft 8 is stopped at a position with a shift of 620 pulses in the minus direction (i.e., counterclockwise) from the ordinary zero point adjustment stop position, if the zero point adjustment is conducted by turning the operation shaft 8 one rotation in the plus direction (i.e., clockwise), and is stopped at a position with the shift of 620 pulses in the plus direction if it is turned one rotation in the minus direction. If, therefore, the difference in the pulse numbers of the counter circuit 26 between the position where the zero position detecting switch 34 is turned on and where the shaft is reversed so that the Z-phase is detected is registered at the first zero point adjustment for moving the robot, then the zero point adjustment can always be ended at the correct position by measuring the difference in the similar pulse numbers at the subsequent zero point adjustments. More specifically, it can be determined: that the correct zero point position is detected if the difference between the registered pulse and the measured pulse is substantially zero; that the shaft is turned one rotation in the minus direction if the difference is about −620 pulses; and that the shaft is turned one rotation in the plus direction if the difference is about +620 pulses. Moreover, it can be said that the zero point adjustment is possibly abnormal if the pulse number is other than the above-specified values.

Figure 7A:
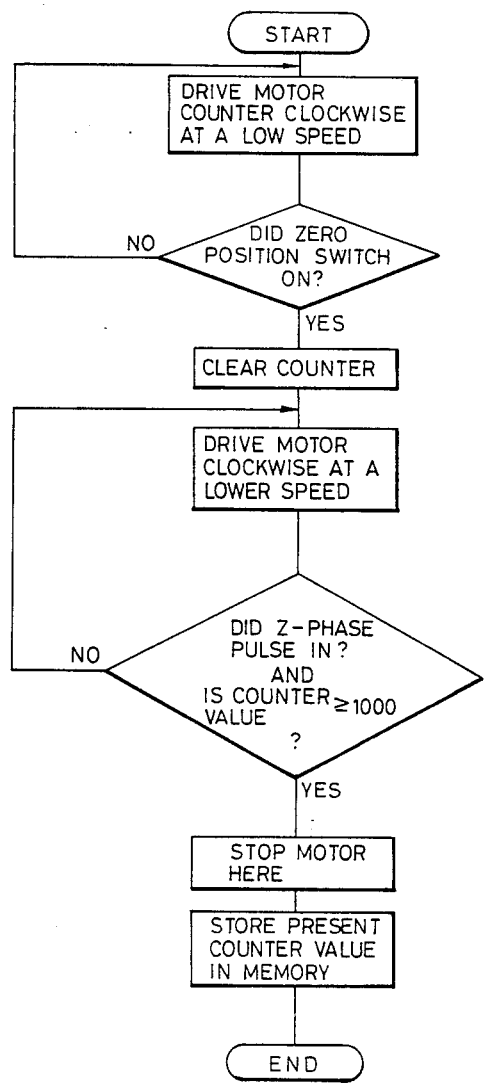
FIGS. 7(a) and 7(b) are flow chart showing a zero point adjustment processing of a CPU.
Figure 7B:
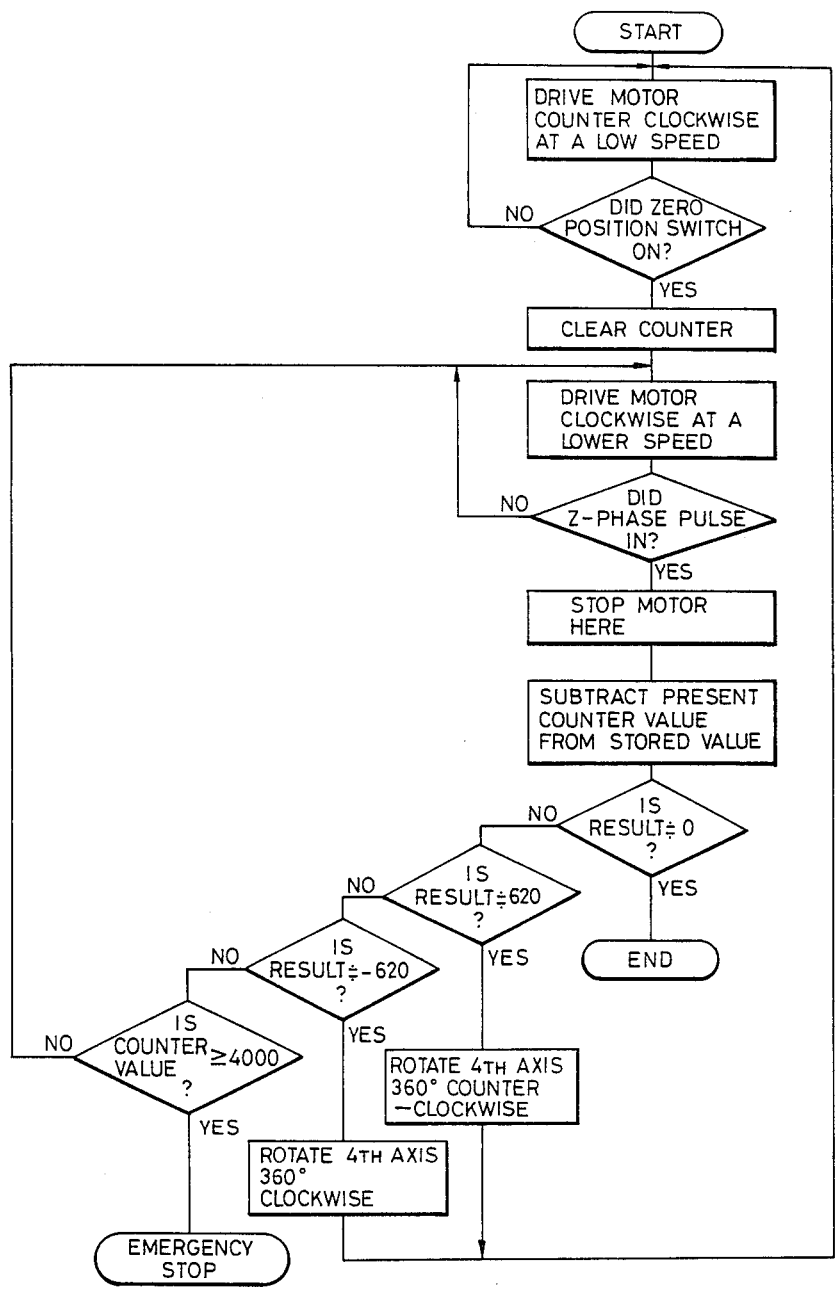

In FIG. 3, the counter value memory 27 is a circuit for registering the difference in the pulse numbers between the position where the zero position detecting switch 34 is turned on at the first zero point adjustment and where the Z-phase is detected. On the other hand, the counter value subtracter 28 is a circuit for subtracting the aforementioned measured value from the registered counter value, and the comparator 29 is a circuit for comparing the value assigned by the CPU 11 and the value computed by the counter value subtracter 28. Moreover, a logic level "1" is outputted to the CPU 11, in case the compared result is within ±50, and a logic level "0" is outputted in case the compared result exceeds ±50. The processing flow chart of the CPU 11 for the ZERO point adjustment using the system thus constructed will be described with reference to FIGS. 7(a) and 7(b). FIG. 7(a) shows the processing for the initial zero point adjustment registration, and FIG. 7(b) shows the processing for the subsequent zero point adjustments. As shown in FIGS. 7(a) and 7(b), at the initial registration, the zero point displacement is eliminated in case the Z-phase pulse appears in the vicinity of the zero position detecting switch 34, by ignoring the Z-phase pulse if this pulse does not appear at a position apart by 1,000 pulses or more from the position where the zero position detecting switch 34 is turned on. Moreover, the mistaken detection of the Z-phase due to disconnection or noises is reduced by making an emergency stop, if the Z-phase pulse does not appear for an advance of 4,000 pulses or more, and by ignoring the Z-phase pulse if this pulse does not have a value near the registered value. In the vertical motions of the 1st and 2nd arms, still moreover, whether or not an accurate zero point detection has been made is determined by establishing only whether or not the compared result of FIG. 7(b) is 0 (i.e., RESULT≈0 ?, as shown in FIG. 7(b)). On the other hand, it is apparent that the counter memory 27, the counter value subtracter 28 and the comparator 29 can be dispensed with by executing the present invention according to the software of the CPU 11.

As has been described hereinbefore, according to the present invention, it is possible to determine whether or not an accurate zero point adjustment could be done even in the case of noises and disconnection and to adjust the zero point to a predetermined position even when the operation shaft has a rotation angle of 360 degrees or more. Since the positioning accuracy of the zero point of the robot is thus improved, there is attained an improvement in the reliability and safety of the robot.

What is claimed is:

1. A robot control method for adjusting the zero point of a robot including: an arm to be controlled; a control operation shaft for turning or vertically operating said arm; a zero position detecting dog for the zero point adjustment of said operation; and a zero position detecting switch adapted to be actuated by said dog, comprising the steps of:

turning said control operation shaft in one direction;

reversing the turns of said control operation shaft, by operating said zero position detecting switch by said zero position detecting dog operating in accordance with said turns, and then stopping the reverse turns of said control operation shaft in response to a pulse outputted from a zero position detecting pulse encoder;

counting and registering the deviation in the pulse number from the zero point to said stop position of said turns at the first zero point adjustment; and comparing said registered deviation pulse number with a new deviation pulse determined as a result of a subsequent zero point adjustment control in accordance with the magnitude of the compared difference.

2. A robot control method according to claim 1, wherein said control operation shaft is at first turned counterclockwise at a low speed and then reversed (turned clockwise) at a lower speed than that of said counterclockwise direction.

3. A robot control method according to claim 1, wherein said pulse encoder is caused to generate both a counting pulse for counting said deviation pulses and a pulse having a larger width than that of said counting pulse for stopping the reversed turns of said control operation shaft from the zero point.

* * * * *